United States Patent
Coleman

[11] Patent Number: 6,052,502
[45] Date of Patent: Apr. 18, 2000

[54] RIBBON OPTICAL CABLE HAVING IMPROVED STRENGTH

[75] Inventor: J. Douglas Coleman, Hickory, N.C.

[73] Assignee: Siecor Corporation, Hickory, N.C.

[21] Appl. No.: 08/935,173

[22] Filed: Sep. 22, 1997

[51] Int. Cl.⁷ ................................................. G02B 6/44
[52] U.S. Cl. ...................... 385/114; 385/100; 385/109; 385/111; 385/112; 385/113
[58] Field of Search ............................. 385/100, 103, 385/105, 106, 109, 112, 113, 114, 141, 111

[56] References Cited

U.S. PATENT DOCUMENTS

| | | | |
|---|---|---|---|
| 4,272,155 | 6/1981 | Slaughter | 350/96.23 |
| 4,361,381 | 11/1982 | Williams | 350/96.23 |
| 4,690,499 | 9/1987 | Taylor et al. | 350/96.23 |
| 4,715,677 | 12/1987 | Saito et al. | 350/96.23 |
| 4,783,954 | 11/1988 | Arke | 57/9 |
| 4,784,461 | 11/1988 | Abe et al. | 350/96.23 |
| 4,807,962 | 2/1989 | Arroyo | 350/96.23 |
| 4,826,279 | 5/1989 | Nishimura et al. | 350/96.23 |
| 4,895,427 | 1/1990 | Kraft | 350/96.23 |
| 4,913,517 | 4/1990 | Arroyo et al. | 350/96.23 |
| 4,944,570 | 7/1990 | Oglesby et al. | 350/96.23 |
| 5,163,116 | 11/1992 | Oestreich et al. | 385/111 |
| 5,166,998 | 11/1992 | Patel | 385/114 |
| 5,179,611 | 1/1993 | Umeda et al. | 385/110 |
| 5,212,756 | 5/1993 | Eoll | 385/114 |
| 5,224,191 | 6/1993 | Zeidler | 385/111 |
| 5,229,851 | 7/1993 | Rahman et al. | 385/114 |
| 5,233,678 | 8/1993 | Katurashima et al. | 385/112 |
| 5,293,443 | 3/1994 | Eoll et al. | 385/114 |
| 5,319,730 | 6/1994 | Rasanen et al. | 385/114 |
| 5,390,273 | 2/1995 | Rahman et al. | 385/112 |
| 5,420,955 | 5/1995 | Cooke et al. | 385/110 |
| 5,495,546 | 2/1996 | Bottoms, Jr. et al. | 385/101 |
| 5,517,591 | 5/1996 | Wagman | 385/110 |
| 5,531,064 | 7/1996 | Sawano et al. | 57/204 |
| 5,542,020 | 7/1996 | Horska | 385/112 |
| 5,561,730 | 10/1996 | Lochkovic et al. | 385/114 |
| 5,561,731 | 10/1996 | Cooke et al. | 385/114 |
| 5,608,832 | 3/1997 | Pfandl et al. | 385/112 |
| 5,649,043 | 7/1997 | Adams et al. | 385/110 |
| 5,671,313 | 9/1997 | Schneider et al. | 385/110 |
| 5,715,344 | 2/1998 | Seo et al. | 385/110 |
| 5,751,881 | 5/1998 | Konda et al. | 385/110 |
| 5,848,212 | 12/1998 | Wagman | 385/111 |
| 5,862,284 | 1/1999 | Paborn et al. | 385/106 |

FOREIGN PATENT DOCUMENTS

| | | | |
|---|---|---|---|
| 58-211714 | 12/1983 | Japan | G02B 5/16 |
| 60-257414 | 12/1985 | Japan | G02B 6/44 |
| 2215081 | 9/1989 | United Kingdom | G02B 6/44 |

OTHER PUBLICATIONS

Siecor Cable Product Code Guidebook, Dec. 1996, p. 18.
International Wire & Cable Symposium Proceedings 1985—p. 117.
Application of High Strength Grooved Wire in Fiber Protection, International Wire & Cable Symposium Proceedings 1986; pp. 136–139.

*Primary Examiner*—Brian Healy
*Attorney, Agent, or Firm*—Timothy J. Aberle

[57] ABSTRACT

A fiber optic cable (10) having a slotted rod (12) with grooves (22) formed therein. At least one groove includes a buffer tube (13) having a ribbon stack (14) supported in a tensile window position within buffer tube (13) by a water blocking material (15). Fiber optic cable (10) has an ample tensile window, whereby macrobending and microbending of optical fibers in the ribbon stacks (14) is minimized.

20 Claims, 3 Drawing Sheets

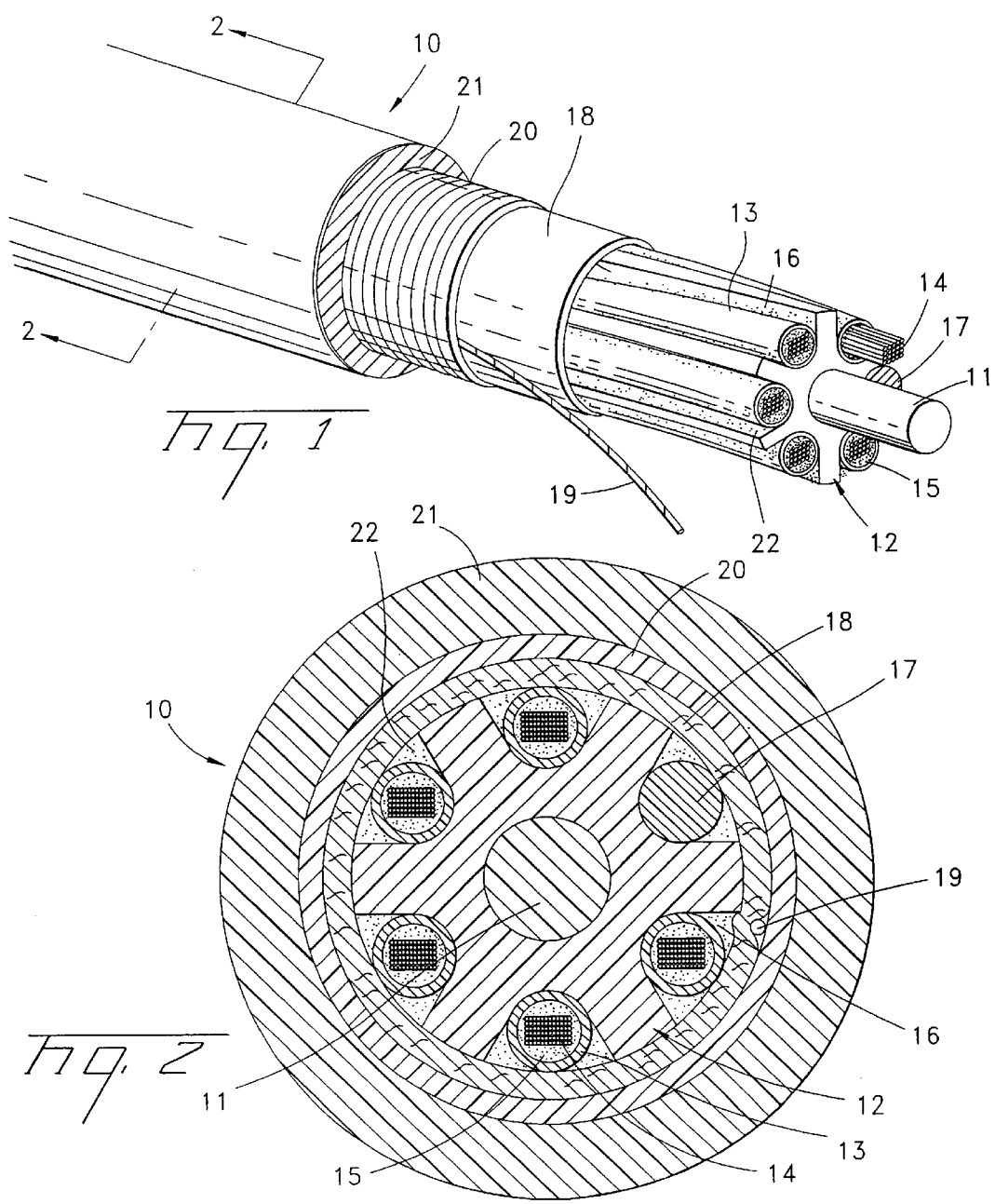

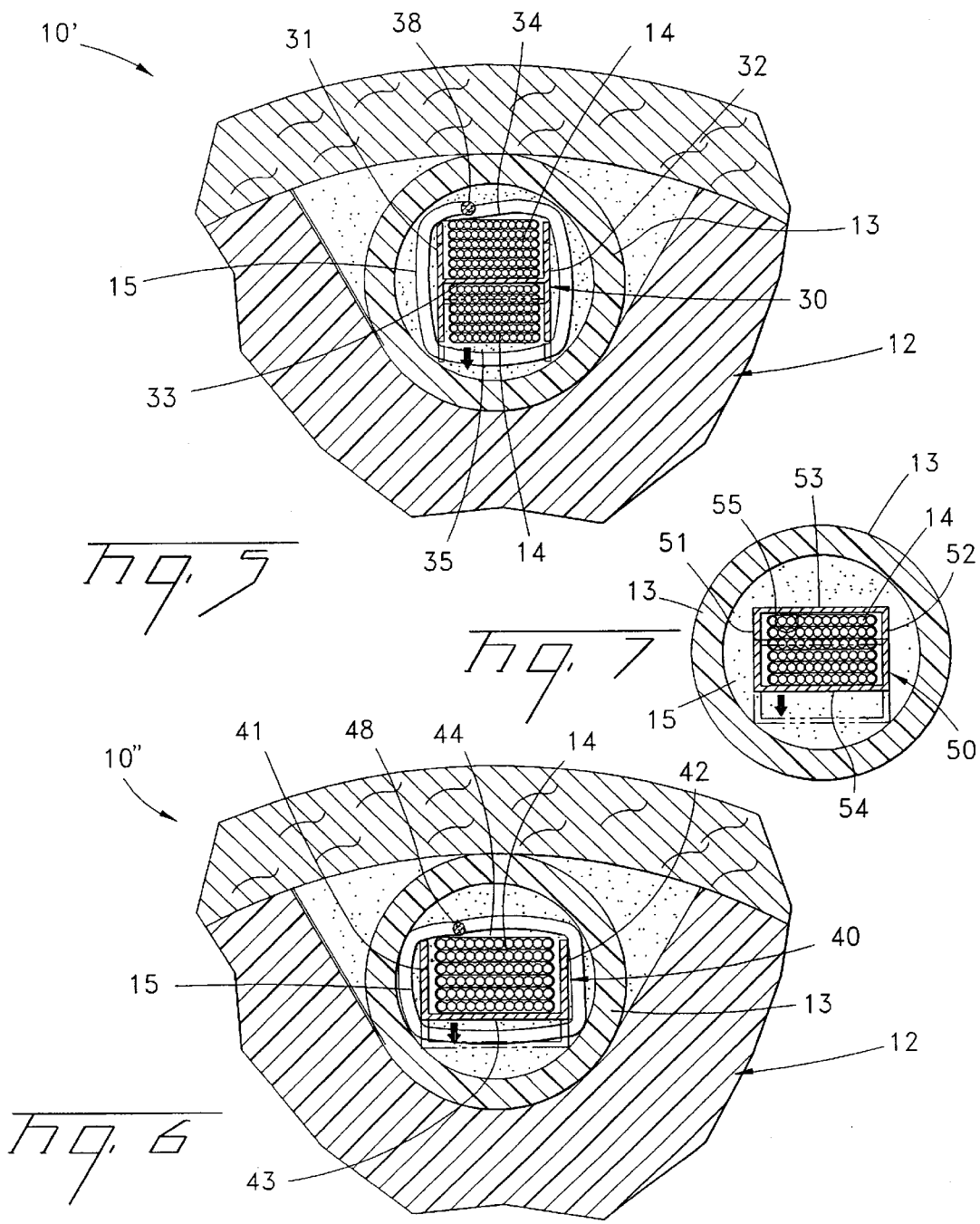

RIBBON OPTICAL CABLE HAVING IMPROVED STRENGTH

The present invention relates to a fiber optic cable and, more particularly, to a fiber optic cable having optical fiber ribbons.

Conventional fiber optic cables comprise optical fiber which transmit information in the form of light signals. Such cables are used to transmit voice, video, and data information. Fiber optic cables may include fiber ribbons, i.e. optical fibers joined together in a common matrix material. Such ribbons are typically stranded together into ribbon stacks. The ribbon stacks are often made part of the fiber optic cable by stranding them into grooves formed in a slotted core rod.

A known fiber optic cable is disclosed in U.S. Pat. No. 4,826,279, wherein a slotted rod is described having a plurality of circumferentially spaced ribs. The ribs extend helically along the exterior of the slotted rod, and grooves are defined between adjacent ribs. Each groove accommodates a respective stack of optical fiber ribbons therein. Due to the inclusion of ribbon stacks, the known optical cable has the potential for a having a high optical fiber count; however, the ribbon stack position in the respective grooves is such that radially inner surfaces of the ribbon stacks are in contact with surfaces of the grooves. Such a ribbon stack position is disadvantageous, particularly where the cable specifications require an ample tensile window.

Tensile window is a measure of how much strain the cable experiences before the optical fibers therein experience strain. Excessive strain on the optical fibers must be avoided because it will negatively affect the ability of the fibers to transmit information. Under normal operating conditions, fiber optic cables experience strain due to tension in the cable. Tension in the cable tends to elongate the cable, and the ribbon stacks may respond by moving radially inwardly toward the center of the cable. However, a ribbon stack closely adjacent to or in contact with the surfaces of a slotted rod or other surface will be restrained from moving, i.e. it will be restrained from adjusting its position when the cable is under tension. Consequently, the restrained ribbon stack may experience a high degree of strain which may cause side wall pressure on the optical fibers. Such side wall pressure may cause macrobending or microbending of the optical fibers, which may cause attenuation of the data transmission. In view of the foregoing, what is needed is a fiber optic cable having the potential for a high fiber count and an ample tensile window so that, when the cable experiences tension, excessive strain and microbending on the optical fibers of the ribbon stacks will be minimized.

OBJECTS OF THE INVENTION

It is therefore an object of the present invention to provide a fiber optic cable having ribbon stacks and an ample tensile window, whereby excessive strain on the ribbon stacks is minimized or avoided.

It is a further object of the present invention to provide a fiber optic cable having a stack of optical fiber ribbons therein, the stack of optical fibers being in a position whereby it is supported in a buffer tube by a water-blocking material, and whereby the cable structure establishes an initial position for the ribbon stack in an non-stressed state and supports movement of the ribbon stack under tension such that an ample tensile window is provided to the fiber optic cable.

It is another object of the present invention to provide a ribbon stack organizer which maintains the position of the ribbon stack for maintaining an ample tensile window for the fiber optic cable and for minimizing or avoiding microbending in the optical fibers.

It is a further object of the present invention to provide a crush-resistant fiber optic cable having a slotted rod with at least one groove formed in the slotted rod, the groove having a buffer tube therein, the buffer tube having a stack of optical fiber ribbons therein, the stack of optical fiber ribbons being supported in the buffer tube by a water-blocking material, the position of the ribbon stack providing an ample tensile window for the fiber optic cable.

It is a further object of the present invention to provide a crush-resistant, fiber optic cable having a slotted rod with at least one groove formed in the slotted rod, the groove having a buffer tube therein, the buffer tube having a stack of optical fiber ribbons in a ribbon organizer, the stack of optical fiber ribbons and the ribbon organizer being supported in the buffer tube by a water-blocking material, the ribbon organizer maintaining the stack stability and minimizing macrobending and microbending of the optical fibers in the ribbon stack and the position of the ribbon stack and ribbon organizer providing an ample tensile window for the fiber optic cable.

BRIEF DESCRIPTION OF THE DRAWINGS

FIG. 1 shows an isometric view of a fiber optic cable according to an embodiment of the present invention.

FIG. 2 shows a cross-sectional view of the fiber optic cable of FIG. 1 taken along line 2—2.

FIG. 5 is a cross sectional view of a section of a fiber optic cable according to the present invention wherein a stack of ribbons within a first-embodiment ribbon organizer is disposed in a buffer tube.

FIG. 6 is a cross sectional view of a section of a fiber optic cable according to the present invention wherein a stack of ribbons within a second-embodiment ribbon organizer is disposed in a buffer tube.

FIG. 7 is a cross sectional view of a section of a buffer tube for use in a fiber optic cable according to the present invention wherein a stack of ribbons within a third-embodiment ribbon organizer is disposed in a buffer tube.

DETAILED DESCRIPTION OF THE INVENTION

Figure 3:
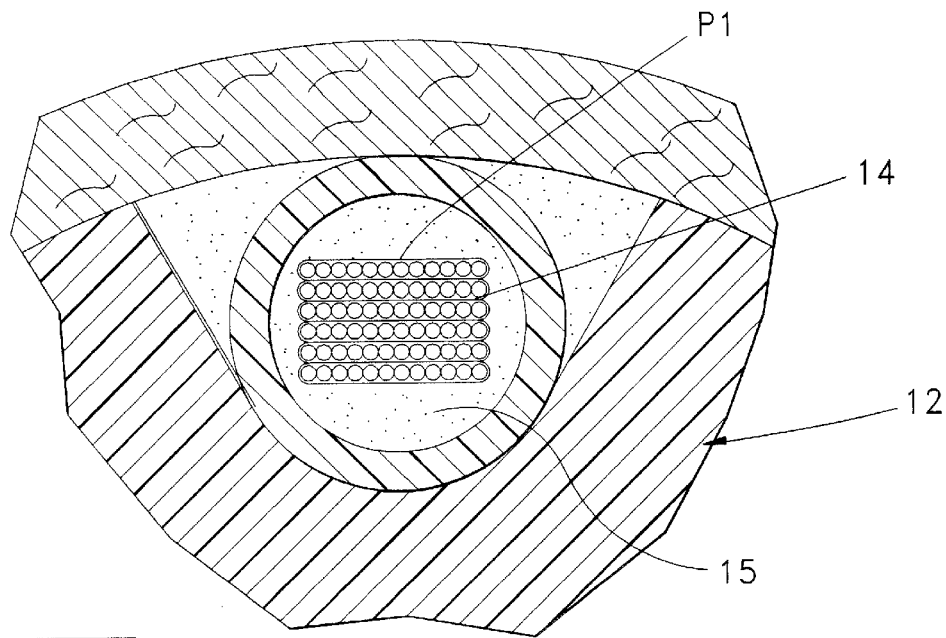
FIG. 3 shows a section of the fiber optic cable of the present invention with a ribbon stack supported in a buffer tube.

Referring to FIGS. 1 and 2, a fiber optic cable 10 according to the present invention will be described. Fiber optic cable 10 includes a central dielectric strength member 11 formed of, for example, a glass-fiber reinforced plastic material. Alternatively, strength member 11 may include conventional, high tensile strength wires as described in U.S. Pat. No. 4,199,224. In either event, strength member 11 is surrounded by a crush-resistant slotted rod 12. Slotted rod 12 includes a plurality of helical or SZ-shaped grooves 22. Slotted rod 12 is advantageous in that it has a high resistance to compressive loads, and the ribs thereof distribute radially applied crushing loads from one side of cable 10 to another while avoiding the application of crushing loads to buffer tubes in the cable. A slotted rod suitable for use in the present invention is disclosed in commonly assigned patent U.S. Pat. No. 4,784,461, which patent is hereby incorporated by reference in its entirety. Buffer tubes 13 are disposed in respective grooves 22; however, a filler rod 17 formed of a polymeric material may be disposed in a groove 22 if the fiber count so requires. Buffer tubes 13 are typically surrounded by a water blocking material 16 comprising a water blocking powder, gel, or jelly within grooves 22 (FIG. 1).

Each groove 22 includes a respective fiber optic ribbon stack 14 therein. Ribbon stack 14 is supported in a tensile window position P1 (FIG. 3) by a hydrophobic, or hydrophilic (not shown) water blocking material 15 disposed in buffer tube 13. Hydrophilic materials and their substrates which are suitable for use in the present invention are disclosed in U.S. Pat. No. 4,913,517, which patent is incorporated by reference herein. Position P1, i.e. the tensile window position, is the unstressed state of cable 10. Water blocking material 15 is preferably a thixotropic material, for example, a silicone gel material or a petroleum-based material; alternatively, water blocking material 15 is compressible, for example, a dry water blocking material comprising a tape or yarn (not shown) which supports ribbon stack 14 in the tensile window position in buffer tube 13. Material 15 has a mechanical stiffness or viscous consistency which supports ribbon stack 14 in the tensile window position inside buffer tube 13, but which permits movement of ribbon stack 14 when cable 10 is subjected to tension. When in the tensile window position, ribbon stack 14 may be generally circumscribed by material 15 and is not in contact with buffer tube 13. The position of ribbon stack 14 may be medial with respect to buffer tube 13, or ribbon stack 14 may be disposed off-center with respect to a center of buffer tube 13; in any event, however, sufficient water blocking material 15 exists about ribbon stack 14 to support the ribbon stack initially in the unstressed tensile window position P1 so that ribbon stack 14 has room to move radially inwardly toward the center of fiber optic cable 10.

Preferably, surrounding slotted rod 12 is a water-blocking material, for example, a tape 18. Tape 18 typically comprises a substrate, e.g. a non-woven tape, which is impregnated with a conventional water swellable material. Tape 18 also performs the function of a conventional binding tape to hold buffer tubes 13 within grooves 22. Surrounding tape 18 may be a metallic tape 20 which may include corrugations. Tape 20 may be coated with a plastic material, and tape 20 may be provided with longitudinally overlapping edges. A ripcord 19 may be disposed along the inner or outer surface of tape 20. An outer jacket 21 surrounds metallic tape 20, and the material of jacket 21 may be selected to bond with the coating material of tape 20 during extrusion of jacket 21 around tape 20.

During manufacture of cable 10, material 15 is applied to ribbon stack 14 during insertion of stack 14 into tube 13. Ribbon stack 14 may be inserted, with a twist, in a generally medial, tensile window position P1 in a respective buffer tube 13 (FIG. 3) and stack 14 is supported in that position by material 15. The percentage excess length of ribbon stack 14 compared to the length of buffer tube 13 may range from −0.03% to +0.30%. Buffer tubes 13 containing supported ribbon stacks 14 are then stranded, in a helical or S-Z stranded manner, into respective helical or SZ-shaped grooves 22.

Figure 4:
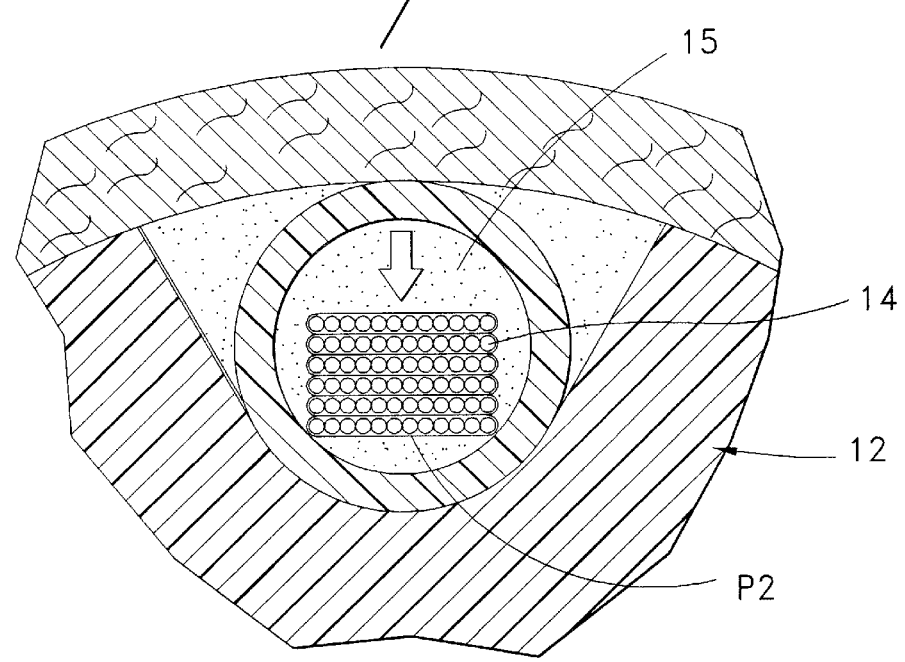
FIG. 4 shows movement of the ribbon stack of FIG. 3 in response to tension acting on the fiber optic cable.

When cable 10 experiences tension, stack 14 will move radially from the tensile window position P1 to a position P2. Position P2 is closer to a surface of buffer tube 13 and is generally closer to the center of cable 10 (FIG. 4). As this occurs, water blocking material 15 flows around ribbon stack 14. Alternatively, in the event a dry water blocking material is used to support ribbon stack 14, preferably the hydrophilic materials and substrate incorporated by reference hereinabove, would be crushed or compressed thereby allowing stack 14 to move. In either event, ribbon stack 14 undergoes tensile window movement unrestrained by buffer tube 13 or groove 22 as it moves from position P1 to P2, thereby avoiding excessive strain on the optical fibers in ribbon stack 14.

FIG. 5 shows a cable 10' according to a second embodiment of the present invention wherein two ribbon stacks 14 are disposed in a generally H-shaped ribbon organizer 30. Ribbon organizer 30 includes two opposing side walls 31,32 interconnected by a web 33. Walls 31,32 and web 33 define two stack-receiving areas 34,35 each with a respective ribbon stack 14 loosely disposed therein with clearance around the edges for minimizing microbending of ribbon edge fibers. Advantageously, a binder or water swellable yarn 38 may be stranded around organizer 30 to retain ribbon stacks 14 in stack receiving areas 34,35. Material 15 is applied generally all around organizer 30 thereby supporting it in the tensile window position within buffer tube 13. The tensile window position of organizer 30 is further defined in that no portions of the organizer are initially in contact with buffer tube 13. When, however, cable 10' experiences sufficient tension, organizer 30 will move, as in the first embodiment of the present invention, along with ribbon stacks 14 but will ensure that the individual ribbons of stack 14 are maintained in alignment during the tensile window movement. In this way, organizer 30 minimizes strain on, and microbending in ribbon edge fibers.

FIG. 6 shows a cable 10" according to a third embodiment of the present invention wherein a ribbon stack 14 is loosely disposed in a ribbon organizer 40 with clearance around the edges for minimizing microbending of ribbon edge fibers. Ribbon organizer 30 is generally U-shaped and includes two opposing thin side walls 41,42 interconnected by a web 43. Walls 41,42 and web 43 define a stack receiving area 44 with a respective ribbon stack 14 loosely disposed therein. A binder member or water swellable yarn 48 may be stranded around organizer 30 to retain ribbon stack 14 in stack receiving area 44. Material 15 is disposed generally around organizer 40 thereby supporting it in generally the tensile window location within buffer tube 13. When, however, cable 10" experiences a sufficient tension, organizer 40 will move toward the center of the cable along with ribbon stack 14, as in the first embodiment of the present invention. Organizer 40 ensures that the individual ribbons of stack 14 are maintained in alignment during the tensile window movement and thus minimizes strain on, and microbending in, the optical fibers.

FIG. 7 shows another embodiment of the present invention wherein a ribbon stack 14 is disposed in a ribbon organizer 50. Ribbon organizer 50 includes two opposing thin side walls 51,52 interconnected by webs 53,54. Walls 51,52 and webs 53,54 define an enclosed stack receiving area 55 with a respective ribbon stack 14 loosely inserted therein with clearance around the edges for minimizing microbending of ribbon edge fibers. Material 15 is disposed generally in and all around organizer 50 thereby supporting it in the tensile window location within buffer tube 13. When, however, a cable which incorporates organizer 50 experiences sufficient tension, organizer 50 will move along with ribbon stack 14 but will ensure that the individual ribbons of stack 14 are maintained in alignment during the movement and thus minimizes strain on, and microbending in, the individual ribbons.

Ribbon organizers 30,40,50 are formed of a suitable material, for example, a thermoplastic, paper, robust tape, or foil material in either rigid or flexible structural designs. Although the wall and web sections of ribbon organizers 30,40,50 are generally about the same thickness, the relative thicknesses thereof may be adapted to suit particular requirements, for example, to meet the requirements of space, weight, and/or flexibility. Additionally, organizers 30,40,50 facilitate handling of the ribbon stack prior to manufacture of the fiber optic cable.

The present invention has thus been described with reference to the foregoing embodiments, which embodiments are intended to be illustrative of the inventive concept rather than limiting. Persons of skill in the art will appreciate that variations and modifications of the foregoing embodiments may be made without departing from the scope of the appended claims. For example, although the invention has been described with reference to a ribbon stack 14, the invention may be practiced with only one ribbon in a tube 13. Additionally, although the present invention has been described with reference to a buffer tube 13, a ribbon stack 14, with or without an organizer 30,40,50, can be supported in a material 15 in a tensile window position in a groove 22.

Accordingly, what is claimed is:

1. A fiber optic cable, comprising:
   a crush-resistant slotted rod with at least one groove;
   a water blocking material located in said groove;
   at least one fiber optic ribbon stack located in said groove;
   the water blocking material generally supports said ribbon stack in a tensile window position relative to said groove; whereby said ribbon stack is moveable from said tensile window position to a second position relative to said groove upon sufficient stress in said fiber optic cable.

2. The fiber optic cable of claim 1, wherein said ribbon stack is disposed in a ribbon organizer, said organizer also being supported and moveable along with said ribbon stack upon sufficient stress acting in said fiber optic cable.

3. The fiber optic cable of claim 1, wherein said ribbon stack is disposed in a ribbon organizer, said organizer being moveable along with said ribbon stack.

4. The fiber optic cable of claim 3, wherein a space defined between said ribbon organizer and said groove narrows during movement of said ribbon stack.

5. The fiber optic cable of claim 1, wherein said ribbon stack and said water blocking material are within a buffer tube disposed in said groove, said ribbon stack being moveable from said tensile window position toward a portion of said buffer tube.

6. The fiber optic cable of claim 5, wherein said ribbon stack tensile window position is generally in a medial location with respect to said buffer tube.

7. The fiber optic cable of claim 1, wherein the ribbon stack is SZ or helically stranded in said groove.

8. The fiber optic cable of claim 1, wherein said water blocking material comprises a hydrophobic material.

9. The fiber optic cable of claim 1, wherein said water blocking material comprises a hydrophilic material.

10. The fiber optic cable of claim 1, wherein said tensile window position is defined by said ribbon stack not contacting adjacent surfaces.

11. A fiber optic cable, comprising:
    a crush-resistant slotted rod with at least one groove;
    a ribbon stack disposed in a ribbon organizer within said groove;
    said ribbon organizer includes wall sections interconnected by a web section, said wall and web sections define a ribbon stack receiving area wherein said ribbon stack is received with clearance for minimizing microbending of ribbon edge fibers.

12. The fiber optic cable of claim 11, wherein said organizer is located in a buffer tube of said fiber optic cable.

13. The fiber optic cable of claim 12, wherein said organizer is supported in said buffer tube by a water blocking material.

14. The fiber optic cable of claim 12, wherein said organizer is initially not in contact with said buffer tube, said organizer being moveable within said buffer tube towards a center of said fiber optic cable.

15. The fiber optic cable of claim 12, wherein the organizer is located in a generally medial position with respect to said buffer tube.

16. The fiber optic cable of claim 11, wherein said organizer is supported by a water blocking material.

17. The fiber optic cable of claim 11, wherein said organizer is initially not in contact with other surfaces, said organizer being moveable towards a center of said fiber optic cable.

18. The fiber optic cable of claim 11, wherein said web comprises a thickness, and at least one of said walls comprises a thickness generally equal to said web thickness.

19. The fiber optic cable of claim 11, wherein said ribbon organizer comprises a plurality of ribbon stack-receiving areas separated by at least one of said web sections.

20. A fiber optic cable, comprising:
    a crush-resistant slotted rod with at least one groove;
    said at least one groove has a buffer tube therein;
    said buffer tube has a water blocking material and a ribbon stack therein;
    said water blocking material supports said ribbon stack in a tensile window position in said buffer tube, said ribbon stack is initially not in contact with adjacent surfaces;
    whereby said ribbon stack is moveable from said tensile window location upon a sufficient tension acting in said fiber optic cable.

* * * * *